(12) United States Patent
Gaully et al.

(10) Patent No.: US 11,873,890 B2
(45) Date of Patent: Jan. 16, 2024

(54) OIL SYSTEM FOR A TURBINE ENGINE

(71) Applicant: SAFRAN AIRCRAFT ENGINES, Paris (FR)

(72) Inventors: Bruno Robert Gaully, Moissy-Cramayel (FR); Germain Michel Emmanuel Bertho, Moissy-Cramayel (FR); Yves Emprin, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 34 days.

(21) Appl. No.: 17/608,567

(22) PCT Filed: May 4, 2020

(86) PCT No.: PCT/FR2020/050743
§ 371 (c)(1),
(2) Date: Nov. 3, 2021

(87) PCT Pub. No.: WO2020/229754
PCT Pub. Date: Nov. 19, 2020

(65) Prior Publication Data
US 2022/0349466 A1   Nov. 3, 2022

(30) Foreign Application Priority Data

May 10, 2019   (FR) ...................................... 1904892

(51) Int. Cl.
*F16H 57/04*   (2010.01)
*F01D 21/12*   (2006.01)
(Continued)

(52) U.S. Cl.
CPC ......... *F16H 57/0435* (2013.01); *F01D 21/12* (2013.01); *F01D 25/20* (2013.01);
(Continued)

(58) Field of Classification Search
CPC ............. F16H 57/0442; F16H 57/0435; F16H 57/0431; B64D 2045/009; F16N 2260/06;
(Continued)

(56) References Cited

U.S. PATENT DOCUMENTS 2,719,197 A * 9/1955 Hall ........................ G01K 7/38
                                                          335/146
3,016,701 A * 1/1962 Kolfenbach .......... F01D 25/125
                                                          60/39.08
(Continued)

FOREIGN PATENT DOCUMENTS

EP   2253805 A2   11/2010
EP   2801707 A1   11/2014
(Continued)

OTHER PUBLICATIONS

International Search Report in International Application No. PCT/FR2020/050743, dated Jul. 6, 2020 (5 pages).
(Continued)

*Primary Examiner* — Loren C Edwards
(74) *Attorney, Agent, or Firm* — Bookoff McAndrews, PLLC

(57) ABSTRACT

Oil system for a turbomachine, making it possible to continue the supply of oil to the pieces of equipment of the turbomachine in case of occurrence of a fire within the turbomachine, including an oil circuit, at least one oil-consuming piece of equipment, supplied by the oil circuit, a pumping unit, including at least one speed-pilotable electrically driven pump, supplying the oil circuit, and an electronic control unit, configured to pilot the electrically driven pump, wherein the electronic control unit includes two separate logics of piloting the electrically driven pump, and wherein the electronic control unit is configured to pilot the electrically driven pump according to the first logic by default and to switch to the second logic in case of receipt (Continued)

of a signal representative of the presence of a fire or of an overheating.

14 Claims, 2 Drawing Sheets

(51) Int. Cl.
    *F01D 25/20*     (2006.01)
    *F02C 7/06*     (2006.01)
    *B64D 45/00*     (2006.01)
    *F01M 1/12*     (2006.01)

(52) U.S. Cl.
    CPC ........... *F02C 7/06* (2013.01); *F16H 57/0431* (2013.01); *F16H 57/0442* (2013.01); *B64D 2045/009* (2013.01); *F01M 2001/123* (2013.01); *F05D 2260/98* (2013.01); *F05D 2270/09* (2013.01); *F16N 2210/02* (2013.01); *F16N 2210/08* (2013.01); *F16N 2260/06* (2013.01); *F16N 2260/20* (2013.01)

(58) Field of Classification Search
    CPC ............. F16N 2260/20; F16N 2210/02; F16N 2210/08; F01D 25/18; F01D 25/20; F01D 21/12; F01D 21/14; F05D 2270/09; F05D 2260/98; F01M 2001/123; F02C 7/06; F02C 7/14
    See application file for complete search history.

(56) References Cited

U.S. PATENT DOCUMENTS

| | | | | |
|---|---|---|---|---|
| 4,309,870 | A * | 1/1982 | Guest | F01D 25/20 60/39.08 |
| 6,886,324 | B1 * | 5/2005 | Handshuh | F01D 25/20 60/39.08 |
| 2016/0123457 | A1 * | 5/2016 | Harreau | F16H 57/0435 184/6.4 |
| 2017/0138214 | A1 * | 5/2017 | Lepretre | F16H 57/0431 |

FOREIGN PATENT DOCUMENTS

| | | |
|---|---|---|
| EP | 2949883 A1 | 12/2015 |
| EP | 3293363 A2 | 3/2018 |
| FR | 2925110 A1 | 6/2009 |
| WO | 2010086422 A1 | 8/2010 |

OTHER PUBLICATIONS

Written Opinion of the International Searching Authority in International Application No. PCT/FR2020/050743, dated Jul. 6, 2020 (9 pages).

* cited by examiner

[Fig. 1]
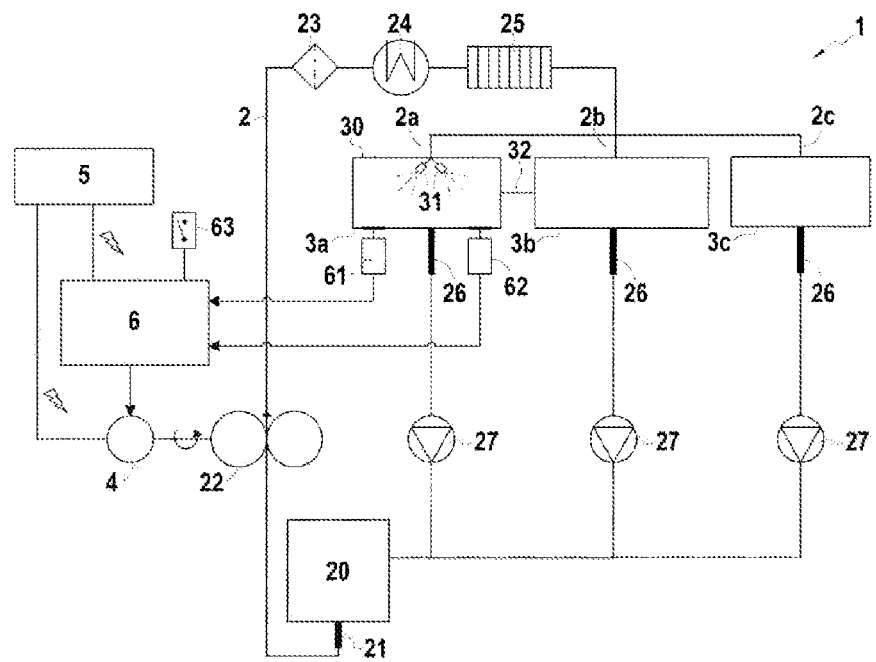
[Fig. 2]
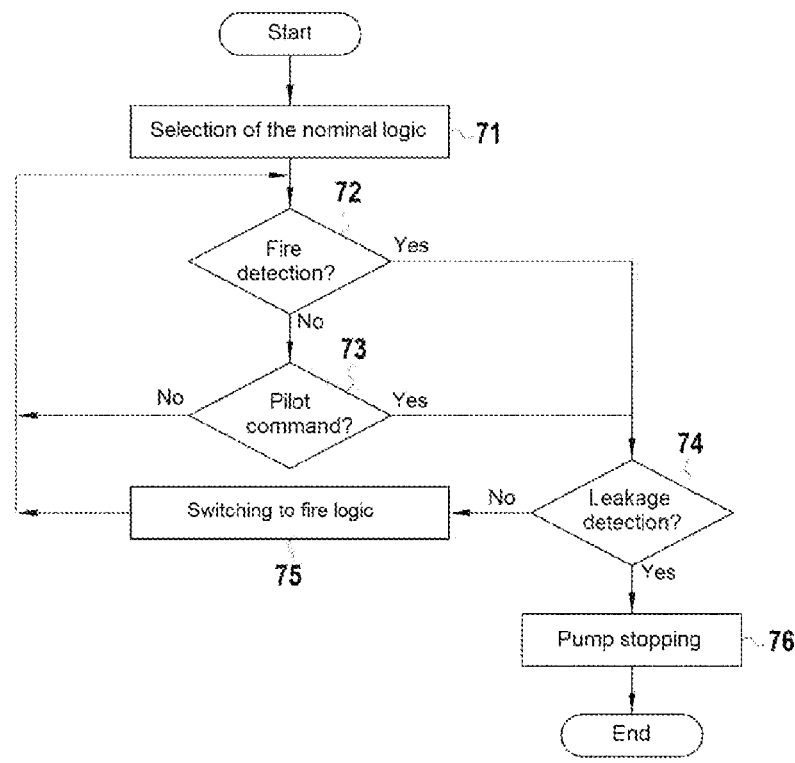

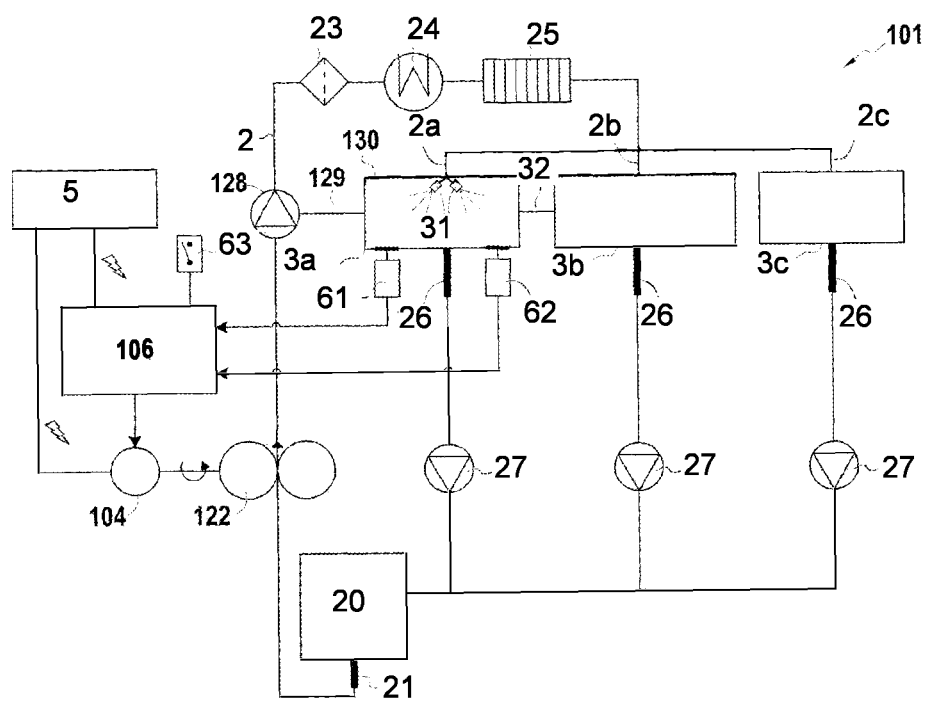
[Fig. 3]

OIL SYSTEM FOR A TURBINE ENGINE

CROSS-REFERENCE TO RELATED APPLICATION(S)

This application is the U.S. national phase entry under 35 U.S.C. § 371 of International Application No. PCT/FR2020/050743, filed on May 4, 2020, which claims priority to French Patent Application No. 1904892, filed on May 10, 2019.

TECHNICAL FIELD

The present disclosure relates to an oil system for a turbomachine, making it possible to continue the supply of oil to the pieces of equipment of the turbomachine in case of occurrence of a fire within the turbomachine.

Such an oil system can be used in any type of turbomachine, and more particularly in the aeronautical field for aircraft turbojet engines.

PRIOR ART

In turbomachines, the oil system ensures the fundamental function of supplying the components of the turbomachine with oil in order to lubricate them and/or cool them in all phases of the operation in order to guarantee correct operation of the turbomachine: particularly, the oil system is responsible for lubricating and cooling the bearings and gears of the turbomachine but also for cooling exchangers as well as some casings subjected to high temperatures such as those of electric generators, pumps or gear boxes.

In the current configurations, the pumps of the oil system are mechanically driven by the Accessory Gear Box (AGB): this accessory gear box, supporting several accessories of the turbomachine, is itself driven by a body of the turbomachine, most often the high-pressure (HP) body, generally by means of an Inlet Gear Box (IGB), a Radial Drive Shaft (RDS), and a Transfer Gear Box (TGB).

Therefore, the speed of rotation of the pumps of the oil system, and therefore the oil flow rate, is a function of the speed of rotation of the body of the turbomachine which drives the accessories.

However, there are situations in which it is necessary to stop the engine while continuing to ensure the oil supply. For example, in case of occurrence of a fire, the fuel inlet is shut off and the speed of the turbomachine then decreases until it reaches the autorotation speed; however, the oil supply must be maintained at a sufficient flow rate to allow the lubrication and especially the cooling of the components of the turbomachine exposed to such an additional source of heat in order to guarantee their mechanical strength and avoid in particular the appearance of oil leaks that could feed the fire.

Consequently, in most current configurations, the pumps of the oil system are over-dimensioned to ensure sufficient flow rate even in case of autorotation speed, therefore increasing the mass, space requirement and cost of the oil system, which impacts the fuel consumption of the turbomachine and therefore the range in the case of an aircraft turbojet engine.

Another known option is to add covering, heat screens or fire-resistant shields to the pieces of equipment in order to limit the effects of heat radiation caused by the fire. However, this also results in an increase in the mass, space requirement and cost of the oil system.

There is therefore a real need for an oil system which would be devoid, at least in part, of the drawbacks inherent in the aforementioned known configurations.

DISCLOSURE OF THE INVENTION

The present disclosure relates to an oil system for a turbomachine, comprising
an oil circuit,
at least one oil-consuming piece of equipment, supplied by the oil circuit, a pumping unit, comprising at least one speed-pilotable electrically driven pump, supplying the oil circuit, and
an electronic control unit, configured to pilot the electrically driven pump,
in which the electronic control unit comprises two separate logics of piloting the electrically driven pump,
in which the electronic control unit is configured to pilot the electrically driven pump according to the first logic by default and to switch to the second logic in case of receipt of a signal representative of the presence of a fire or of an overheating.

Thus, thanks to such an electrically driven pump, it is possible to overcome the speed of rotation of the turbomachine and therefore to decouple the speed of rotation of the pump, and therefore the oil flow rate, from the actual speed of the turbomachine. Consequently, even in case of degraded operation of the turbomachine, for example in the event of a shutdown following the occurrence of a fire, the oil system can continue to operate normally.

Indeed, particularly, the electrical energy required for the driving of the pump can be provided both by the turbomachine and by the aircraft, for example in case of degraded operation of the turbomachine.

In addition, thanks to such an electrically driven pump, it is possible to pilot the oil flow rate according to the actual needs of the turbomachine, possibly in real time. Particularly, this allows ensuring a sufficient oil flow rate in case of fire, possibly a greater flow rate, in order to effectively cool the pieces of equipment without having to over-dimension the pump.

Thanks to such improved cooling, the present configuration also allows reducing or eliminating the need for heat shields.

Therefore, the present configuration benefits from a reduced mass, space requirement and cost compared to the existing configurations.

In some embodiments, the electronic control unit is configured to stop the electrically driven pump when receiving a leakage signal coming from a leakage detector. This is preferably an oil leakage detector. Thanks to the leakage detector, emitting for example a leakage signal when it measures a pressure drop in the oil circuit exceeding a certain threshold, it is possible to stop the oil supply as soon as a leak is detected: the oil leakage flow rate is thus reduced or cancelled, which reduces the risk of feeding the fire with this leakage oil.

In some embodiments, the first nominal logic allows piloting the electrically driven pump in a first speed range, and the second logic, in case of fire, allows piloting the electrically driven pump in a second speed range. It is specified in this regard that the first and/or the second speed range can be reduced to a single value or to a set of discrete values.

In some embodiments, the second speed range is greater, at least on average, and preferably strictly greater, than the autorotation speed of the motor, also called windmilling speed.

In some embodiments, the oil circuit comprises one or several elements among the following: line, oil tank; strainer; filter; fuel/oil exchanger; air/oil exchanger and recovery pump.

In some embodiments, at least one oil-consuming piece of equipment is an accessory gear box. Indeed, the accessory gear box is generally located in a fire area, that is to say an area of the turbomachine particularly likely to experience the occurrence of a fire and therefore protected accordingly.

In some embodiments, the accessory gear box comprises accessory gears contained in a casing.

In some embodiments, the accessory gear box comprises sprinklers configured to spray oil from the oil circuit onto at least one, preferably internal, wall of the casing of the accessory gear box. According to the configurations, these sprinklers can operate continuously, in order to cool the casing of the accessory gear box permanently, or only in case of fire, in order to cool the casing in case of direct exposure to fire and delay as much as possible its melting. In such a case, the triggering of the sprinklers can be controlled by the electronic control unit.

In some embodiments, at least one oil-consuming piece of equipment is an electrical generator connected to the accessory box. Indeed, such an electric generator heats up easily and therefore needs to be cooled.

In some embodiments, at least one oil-consuming piece of equipment is an enclosure containing at least one bearing. Indeed, such bearings require both a lubrication function and a cooling function.

In some embodiments, the electrically driven pump is driven by at least one electric motor. This electric motor can in particular be of the direct current type or of the asynchronous type.

In some embodiments, the electrically driven pump is driven by two redundant electric motors. In this way, the continuity of the oil supply is ensured even in case of failure of one of the electric motors, for example if the latter is at the origin of the detected fire.

In some embodiments, the pumping unit comprises a mechanically driven main pump coupled for example to the accessory gear box, and an electrically driven secondary pump. In this manner, the oil supply can be ensured by the main pump in normal operation, the secondary pump taking over, or assisting at least the main pump, in degraded operation: in such a case, the main pump, although mechanically driven, can remain of a modest size.

In some embodiments, the oil system comprises at least one fire detector so configured to emit a signal representative of the presence of a fire when it detects the presence of a fire in a fire area of the turbomachine, preferably in the vicinity of the casing of the accessory box. For example, the fire detector can be located between the casing of the accessory box and the boundaries of the fire area in which this accessory box is located. Particularly, when the accessory box is located radially outside the secondary flowpath, this fire area can be delimited by the fan casing and the outer fan duct wall on the one hand and the casing of the nacelle on the other hand; when the accessory box is located radially between the main flowpath and the secondary flowpath, this fire area can be delimited between the casing of the motor on the one hand and the inner fan duct wall on the other hand. For example, the detector can emit the signal representative of the presence of a fire when it measures a temperature exceeding a certain threshold.

In some embodiments, the fire detector is of the pneumatic type, triggering for example according to the expansion of a gas contained in an enclosure.

In some embodiments, the fire detector is of the thermocouple type.

In some embodiments, the fire detector is of the thermistor type.

In some embodiments, at least one fire detector is mounted on the casing of the accessory gear box. This therefore allows switching to the second control logic when a fire threatens the integrity of the accessory gear box.

In some embodiments, the oil system comprises at least one manual switch configured to emit a signal representative of the presence of a fire when it is manually activated. This allows the pilot of the aircraft to force the switching to the second control logic, for example when other information has revealed to him the presence of a fire in the turbomachine.

In some embodiments, the first control logic is based on a normal operating speed of the turbomachine. The first control logic therefore substantially reproduces the behavior of a pump driven by the accessory gear box.

In some embodiments, in the first control logic, the pilot speed of the electrically driven pump is a function of the speed of rotation of a body of the turbomachine, preferably the high-pressure body of the turbomachine. For example, the pilot speed of the electrically driven pump can be proportional to the speed of rotation of this body of the turbomachine. The pilot speed can also be adjusted so that the overall flow rate of the pumping unit is proportional to the speed of rotation of this body of the turbomachine. In this manner, the supply flow rate increases substantially according to the oil needs of the turbomachine.

In some embodiments, the second control logic is based on the autorotation speed of the turbomachine. It thus allows taking into account the fact that the turbomachine rotates at a reduced speed; however, this does not imply that the pilot speed in the second control logic corresponds to the autorotation speed of the turbomachine; on the contrary, this pilot speed will generally be higher than this autorotation speed. Thus, in the second control logic, the pilot speed is not proportional to the speed of rotation of any of the bodies of the turbomachine.

In some embodiments, in the second control logic, the pilot speed of the electrically driven pump is a predetermined value, possibly taking into account the model of the turbomachine. The pilot speed can also be adjusted such that the overall flow rate of the pumping unit assumes a predetermined value, possibly taking into account the model of the turbomachine. Indeed, in the second control logic, the needs for oil are mainly linked to the cooling needs in order to fight the fire and therefore do not depend, or practically not, on the speed of the turbomachine. Particularly, this predetermined value can be chosen so as to ensure a flow rate such as below.

In some embodiments, in the second control logic, the overall flow rate of the pumping unit is comprised between 100 and 600 l/h, preferably between 100 and 300 l/h, more preferably between 150 and 200 l/h.

The present disclosure also relates to a turbomachine, comprising an oil system according to any one of the preceding embodiments.

The aforementioned characteristics and advantages, as well as others, will become apparent upon reading the following detailed description of exemplary embodiments of the proposed oil system. This detailed description refers to the appended drawings.

BRIEF DESCRIPTION OF THE DRAWINGS

The appended drawings are schematic and aim primarily to illustrate the principles of the disclosure.

In these drawings, from one figure to another, identical elements (or parts of elements) are identified by the same reference signs.

FIG. 1 is a diagram of a first oil system according to the disclosure.

FIG. 2 represents a control flow chart of the oil system.

FIG. 3 is a diagram of a second oil system according to the disclosure.

DESCRIPTION OF THE EMBODIMENTS

In order to make the disclosure more concrete, an example of an oil system is described in detail below, with reference to the appended drawings. It is recalled that the invention is not limited to this example.

FIG. 1 schematically illustrates a first example of an oil system 1 according to the disclosure.

This oil system 1 comprises an oil circuit 2 supplying oil to a plurality of pieces of equipment 3a, 3b, 3c. The oil circuit 2 comprises, from upstream to downstream, a tank 20, a strainer 21, a supply pump 22, a filter 23, a fuel/oil exchanger 24, an air/oil exchanger 25, the pieces of equipment 3, each provided on a separate supply branch 2a, 2b, 2c, bypassing each other, strainers 26 and recovery pumps 27, downstream of each piece of equipment 3, making it possible to return the oil from each supply branch 2a, 2b, 2c to the tank 20.

In the present example, the pieces of equipment 3a, 3b, 3c comprise a gear box, preferably the accessory gear box 30 of the turbomachine. Thus, more specifically, the oil circuit 2 comprises a plurality of sprinklers 31 provided inside the accessory gear box 30 for spraying oil on its gears as well as on at least some of inner walls of its casing. The oil thus sprayed is then recovered at the lowest point of the accessory gear box 30. The pieces of equipment 3a, 3b, 3c can also comprise other gear boxes, casings of other accessories, or bearing enclosures. Some of these pieces of equipment 3a, 3b, 3c can be driven by the accessory gear box 30 using a mechanical transmission 32. It goes without saying that the oil circuit 2 can supply any number of pieces of equipment 3a, 3b, 3c, and not just three as represented in FIG. 1.

The oil system 1 further comprises an electric motor 4 whose mechanical outlet is coupled to the supply pump 22 in order to drive it. It is for its part supplied by an electric power supply 5, provided on the turbomachine itself and/or on the aircraft: it can be for example an electric generator, a battery or a combination of these two means. Preferably, the electric power supply 5 will be ensured by an electric generator of the turbomachine, driven by the rotation of the latter, in normal operation, and by a battery provided on the aircraft in degraded operation, in case of fire for example. In the present example, the electric motor 4 is of the asynchronous type.

The oil system 1 further comprises an electronic control unit 6 supplied by the power supply 5 and configured to control the electric motor 4. More specifically, in most cases, the electronic control unit 6 controls in fact an inverter which modifies the electric current supplying the electric motor 4, which consequently modifies the speed of rotation of the latter and therefore speed pilots the supply pump 22. However, in other examples, it could be any other electric motor piloting device.

The oil system 1 further comprises at least one fire detector 61, mounted on the casing of the accessory gear box 30, and a leakage detector 62, provided within the accessory gear box 30. In the present example, the fire detector 61 is a pneumatic detector in which a gas expands until activating a switch when the temperature exceeds a predetermined threshold; the leakage detector 62 for its part detects an abnormal pressure drop between two points of the oil circuit 2. The oil system 1 also comprises at least one switch 63 provided in the cockpit of the aircraft: it allows the pilot to report manually the presence of a fire. The electronic control unit 6 receives as input the signals of these detectors 61, 62 and of this switch 63.

Of course, the electronic control unit 6 can receive the signals from a larger number of detectors and/or switches. More generally, the electronic control unit 6 can be integrated within the FADEC (Full-authority digital engine control) of the turbomachine.

At least two control logic of the electric motor 4 are stored in the memory of the electronic control unit 6: a first control logic, called nominal logic; and a second control logic, called fire logic.

The nominal logic is programmed to reproduce as much as possible the behavior of a mechanically driven pump coupled to the HP shaft of the turbomachine. Consequently, in the present example, the nominal logic provides for controlling the electric motor 4 so that its speed of rotation is proportional to the speed of rotation of the HP body of the turbomachine, conventionally called speed N2. A suitable sensor allows transmitting the information relating to this speed N2 to the electronic control unit 6.

The fire logic is programmed to ensure a sufficient oil flow rate in case of fire, making it possible to ensure the cooling of the pieces of equipment 3a, 3b, 3c facing the heat radiation of the fire so as to preserve them at least for a minimum statutory period. It takes into account in particular the fact that the fuel supply to the turbomachine is interrupted in case of fire such that its speed is strongly slowed down, in fact corresponding to the autorotation speed of the turbomachine. Consequently, in the present example, the fire logic provides for controlling the electric motor 4 such that its speed of rotation, or the flow rate of the supply pump 22, is equal to a predetermined value. In the present example, the fire logic controls the electric motor 4 so as to ensure a supply flow rate of 150 l/h.

The control routine of the electronic control unit 6, stored in the memory of the latter, will now be presented with reference to FIG. 2.

At the start of this routine, the nominal logic is selected by default (step 71) then the routine progresses to step 72.

During this step 72, the electronic control unit 6 checks whether a fire has been detected by the detector 61: if not, the routine progresses to step 73; conversely, if a fire is detected, the routine progresses to step 74.

If no fire has been detected, the electronic control unit 6 checks during step 73 whether the pilot has actuated the switch 63: if not, the routine returns to step 72; Conversely, if the pilot has actuated the switch 63, thereby manually reporting the presence of a fire, the routine progresses to step 74.

Thus, as long as the presence of a fire is neither detected by the detector 61 nor reported by the pilot using the switch 63, the routine loops and thus maintains the nominal logic active.

On the other hand, if a fire is detected or reported, the routine reaches step 74. During this step 74, the electronic control unit 6 checks whether an oil leak has been detected by the detector 62; if not, the routine progresses to step 75; conversely, if a leak is detected, the routine progresses to step 76.

In case where no leak is detected, the electronic control unit 6 switches to the fire logic during step 75 and returns to step 72.

Thus, as long as the fire is present and no leak is detected, the routine loops and keeps the fire logic active.

On the other hand, if a leak is detected, the routine reaches step 75 and the electronic control unit 6 then triggers the stopping of the electric motor 4 and therefore of the supply pump 22 so as not to feed the fire with oil coming from this leak. The routine then ends.

In this example, the detector 61 was a detector intended to detect the presence of a fire. However, this detector, or an additional detector, can also allow detecting the presence of an overheating, even before the start of a fire. For example, the system can comprise one or several detectors capable of detecting an abnormal temperature rise or the bursting of some components of the system such as a pipe for example.

FIG. 3 schematically illustrates a second example of an oil system 101 according to the disclosure.

This oil system 101 is quite similar to that of the first example, except that its pumping unit comprises a mechanical main pump 128 driven by the accessory gear box 130 using a mechanical transmission 129, and a secondary pump 122, similar to the supply pump 22 of the first example, driven by the outlet of the electric motor 104.

As in the first example, at least two control logics of the electric motor 104 are stored in the memory of the electronic control unit 106: a first control logic, called nominal logic; and a second control logic, called fire logic.

The nominal logic, corresponding to the normal operation of the turbomachine, provides for controlling the electric motor 104 at low speed, or at zero speed: indeed, the main pump 128 being driven by the accessory gear box 130, its speed of rotation is already proportional to the speed of the HP body of the turbomachine such that the single main pump ensures a sufficient oil flow rate for the normal operation of the turbomachine.

The fire logic is programmed for its part to ensure sufficient oil flow rate in case of fire, taking into account the fact that the speed of the turbomachine is strongly slowed down and therefore that the speed of the main pump 128 is itself also strongly slowed down. Consequently, as in the first example, the fire logic provides for controlling the electric motor 104 such that its speed of rotation, or the flow rate of the pumping unit, is equal to a predetermined value, chosen for example so as to ensure a supply flow rate of 150 l/h.

The control routine of the electronic control unit 106, stored in the memory of the latter, is similar to that of the first example, illustrated in FIG. 2.

Although the present invention has been described with reference to specific exemplary embodiments, it is obvious that modifications and changes can be made to these examples without departing from the general scope of the invention as defined by the claims. Particularly, individual characteristics of the different illustrated/mentioned embodiments can be combined in additional embodiments. Consequently, the description and the drawings should be considered in an illustrative rather than a restrictive sense.

It is also obvious that all the characteristics described with reference to one method are transposable, alone or in combination, to one device, and conversely, all the characteristics described with reference to one device are transposable, alone or in combination, to one method.

The invention claimed is:

1. An oil system for a turbomachine, comprising:
an oil circuit,
at least one oil-consuming piece of equipment, supplied by the oil circuit,
a pumping unit, comprising at least one speed-pilotable electrically driven pump, supplying the oil circuit, and
an electronic control unit, configured to pilot the electrically driven pump,
wherein the electronic control unit comprises two separate logics of piloting the electrically driven pump,
wherein the electronic control unit is configured to pilot the electrically driven pump according to a first logic of the two separate logics by default and to switch to a second logic of the two separate logics in case of receipt of a signal representative of a presence of a fire or of a signal representative of an overheating,
wherein, in the first logic and the second logic, a pilot speed of the electrically driven pump is non-zero, and
wherein the electronic control unit is configured to stop the electrically driven pump when receiving a leakage signal coming from a leakage detector.

2. The oil system according to claim 1, wherein the at least one oil-consuming piece of equipment is an accessory gear box, and
wherein the accessory gear box comprises accessory gears contained in a casing.

3. The oil system according to claim 2, wherein the accessory gear box comprises sprinklers configured to spray oil from the oil circuit onto at least one wall of the casing of the accessory gear box.

4. The oil system according to claim 1, wherein the electrically driven pump is driven by at least one electric motor.

5. The oil system according to claim 1, wherein the pumping unit comprises a mechanically driven main pump and the electrically driven pump.

6. The oil system according to claim 1, comprising at least one fire detector configured to emit a signal representative of a presence of a fire when the fire detector detects the presence of the fire in a fire area of the turbomachine.

7. The oil system according to claim 1, comprising at least one manual switch configured to emit a signal representative of the presence of a fire when it is manually activated.

8. The oil system according to claim 1, wherein, in the first control logic, the pilot speed of the electrically driven pump is a function of a speed of rotation of a body of the turbomachine.

9. The oil system according to claim 8, wherein, in the first logic, the pilot speed of the electrically driven pump is proportional to the speed of rotation of said body of the turbomachine.

10. The oil system according to claim 1, wherein, in the second control logic, the pilot speed of the electrically driven pump is a predetermined value.

11. The oil system according to claim 10, wherein, in the second logic, the predetermined value is equal to or higher than an autorotation speed of the turbomachine.

12. The oil system according to claim 1, wherein, in the second control logic, an overall flow rate of the pumping unit is comprised between 100 l/h and 600 l/h.

13. A turbomachine, comprising the oil system according to claim 1.

14. The oil system according to claim 1, wherein, in the first logic, the electrically driven pump is piloted in a first speed range, and, in the second logic, the electrically driven pump is piloted in a second speed range.

\* \* \* \* \*